United States Patent [19]
Gerresheim et al.

[11] Patent Number: 4,909,074
[45] Date of Patent: Mar. 20, 1990

[54] METHOD OF DETERMINING A VARIABLE AIR PRESSURE VALUE OF A PNEUMATIC VEHICLE TIRE AND INDICATING A PRESSURE VALUE

[75] Inventors: Manfred Gerresheim, Würselen; Boris Nitsch, Aachen; Gerhard Mauk, Wunstorf, all of Fed. Rep. of Germany

[73] Assignee: Uniroyal Englebert Reifen GmbH, Aachen, Fed. Rep. of Germany

[21] Appl. No.: 289,495

[22] Filed: Dec. 20, 1988

Related U.S. Application Data

[63] Continuation-in-part of Ser. No. 928412, Nov. 7, 1986, now abandoned.

[30] Foreign Application Priority Data

Nov. 7, 1985 [DE] Fed. Rep. of Germany ....... 3539489

[51] Int. Cl.$^4$ .............................................. B60C 23/00
[52] U.S. Cl. .................................. 73/146.4; 73/146.5; 200/61.22; 200/61.25; 340/442; 340/445
[58] Field of Search .......................... 340/58, 442, 445; 73/146.4, 146.5, 146.8, 146; 200/61.22, 61.25; 116/34 R

[56] References Cited

U.S. PATENT DOCUMENTS

| | | | |
|---|---|---|---|
| 4,052,696 | 10/1977 | Enabit | 73/146.5 |
| 4,143,545 | 3/1979 | Sitabkhan | 73/146.8 |
| 4,254,312 | 3/1981 | Migrin et al. | 200/61.25 |
| 4,275,377 | 6/1981 | Matsuda et al. | 340/58 |
| 4,300,118 | 11/1981 | Matsuda et al. | 340/58 |
| 4,335,283 | 6/1982 | Migrin | 200/61.25 |
| 4,562,874 | 1/1986 | Scheller | 73/146.5 |
| 4,567,459 | 1/1986 | Folger et al. | 340/58 |
| 4,609,905 | 9/1986 | Uzzo | 340/58 |
| 4,695,823 | 9/1987 | Vernon | 340/58 |

FOREIGN PATENT DOCUMENTS

| | | | |
|---|---|---|---|
| 0221522 | 5/1987 | European Pat. Off. | 340/58 |
| 3029563 | 6/1985 | Fed. Rep. of Germany . | |
| 3104013 | 7/1985 | Fed. Rep. of Germany . | |
| 2124776 | 2/1984 | United Kingdom | 340/58 |

Primary Examiner—Joseph A. Orsino
Assistant Examiner—Brent A. Swarthout
Attorney, Agent, or Firm—Robert W. Becker & Associates

[57] ABSTRACT

A method for detecting, evaluating, and indicating a tire air pressure value. Information signals are compared with a plurality of desired value curves having a tolerance range and an average value for the atmospheric temperature, whereupon these signals are evaluated. The pressure deviation, as a function of the desired value tolerance ranges, is assigned a specific pressure state, from which an acutal air pressure state is indicated that takes into account regional and seasonal pressure and temperature influences. Furthermore, a maximum speed and a permissible speed can be determined during emergency operation, or a state of emergency operation can be determined.

5 Claims, 5 Drawing Sheets

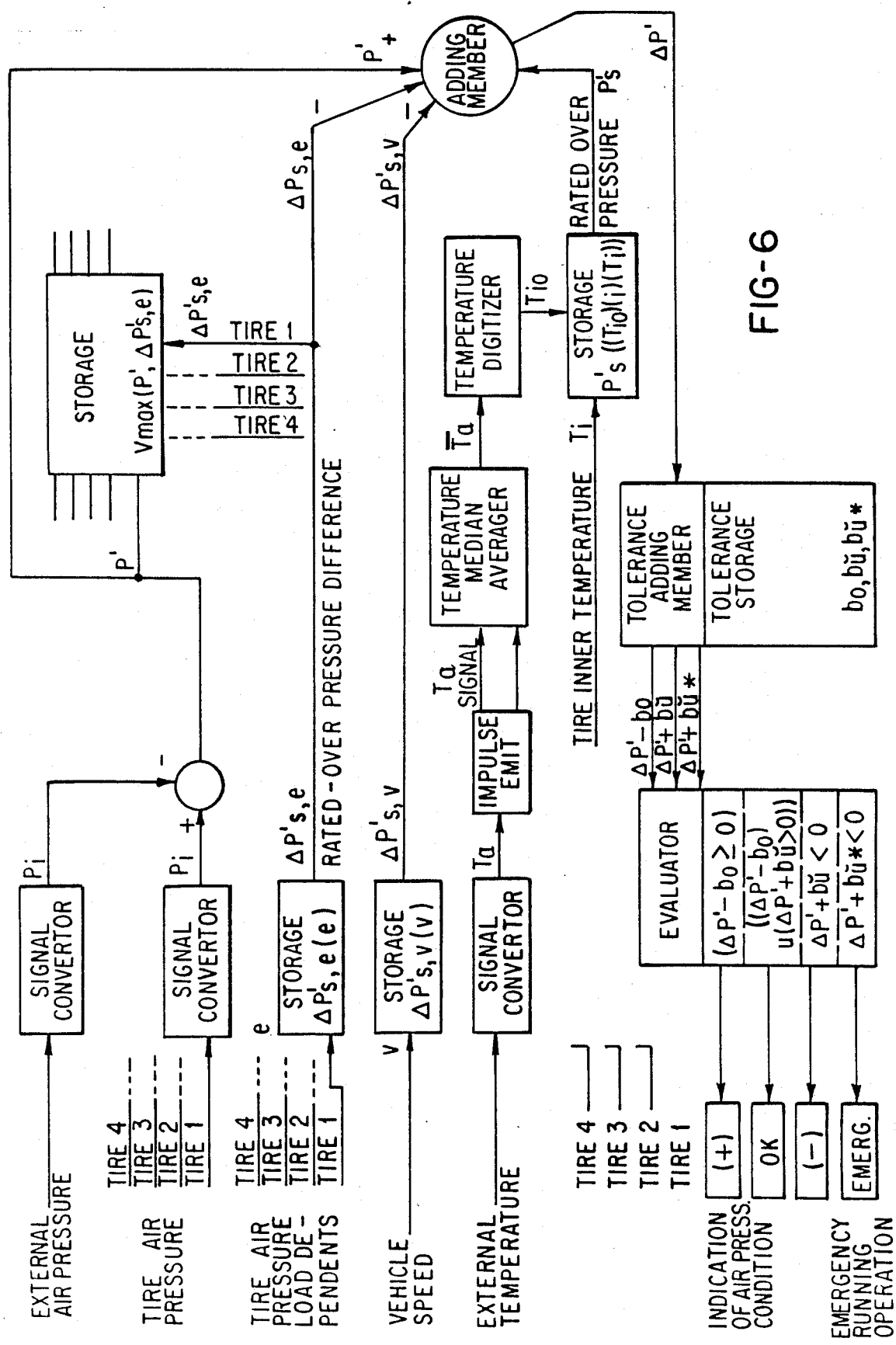

METHOD OF DETERMINING A VARIABLE AIR PRESSURE VALUE OF A PNEUMATIC VEHICLE TIRE AND INDICATING A PRESSURE VALUE

This application is a continuation-in-part of application Ser. No. 928,412, filed Nov. 7, 1986, now abandoned.

BACKGROUND OF THE INVENTION

The present invention relates to a method according to which a variable air pressure value of a pneumatic vehicle tire is determined and transmitted. In so doing, an information signal that corresponds to the air pressure value is transmitted in a non-contact manner from a measured value emitter to a measured value receiver, with this signal being evaluated electronically or in a data circuitry or analyzer. The information signal is compared with desired values, at least for air pressure within the pneumatic vehicle tire, and a deviating measured value, including the value 0, is determined. An air pressure state corresponding to the measured value is then indicated. Such an air pressure state is preferably indicated to the driver of the vehicle for each vehicle wheel during operation.

To transmit a variable measured value for the tire pressure of pneumatic vehicle wheels, a method is known from German Pat. No. 30 29 563, dated June 20, 1985, corresponding to U.S. Pat No. 4, 567,459-Folger et al issued Jan. 28, 1986, according to which either the information signal is continuously independent of the tire pressure and an associated desired value is changed in conformity to the atmospheric temperature, or a constant desired value that is independent of the atmospheric temperature is only independent above a prescribed critical temperature, and below this critical temperature is dependent on the tire temperature.

The tire pressure is determined by the factors of atmospheric pressure, inner temperature of the tire, and specific air volume. With the heretofore known method, pressure and temperature are not taken into consideration as much as would be advisable in order to be able to give the best possible information to the driver.

A positive change of the atmospheric pressure results in a negative change in the tire pressure, with regional changes in the atmospheric pressure of up to 0.1 bar being possible, and without altitude differences changing the atmosphere pressure by only 0.1 bar per 1000 m. Temperature changes result in a directly proportional change in pressure, whereby, for example, at average passenger car tire air pressures, a 10° C. temperature difference corresponds approximately to a 0.1 bar pressure difference. With large tires the pressure difference is even greater due to the higher air pressure that is provided. A positive change in volume effects a negative change in pressure that proportionately can be up to 1.5 times greater. The differences relative to the desired pressure that can result during a driving operation achieve up to 0.5 bar, even if a driver takes great care to regularly check the tire pressure. And if a driver doesn't regularly check the tire pressure as prescribed by the owner manual, the difference to the desired pressure can be even greater. And if the driver doesn't check the tire pressure at all for a long period of time, the difference to the desired pressure over a single season can be as much as 1 bar.

A method designed for determining the changed air pressure, and an evaluation for indicating the actual pressure state, should take into account the aforementioned factors. The systematic indication helps to assure a great active reliability, with reliability against tire failure, and improved constant driving conditions, being significant. The indication should furthermore offer improved maintenance convenience, by normally making it possible to increase the intervals between times when the air pressure has to be attended to. Furthermore, the tire pressure that can best be provided by indication helps to save energy by having a reduced resistance to rolling. There thus results a greater economy. In addition, the tire lasts longer due to more uniform wear.

It is therefore an object of the present invention, while taking into consideration the aforementioned facts, to provide a method for determining, evaluating, and indicating a constant or changed tire air pressure, whereby changing pressure and temperature influences caused by regional and seasonal conditions are reliably taken into account.

The information signals should be compared with appropriate desired values. The deviations determined by the evaluation should be indicated as the actual tire air pressure state. These pressure states, on the one hand, should include an air pressure range that is optimum for the driving operation, and on the other hand should include the excess pressure range disposed thereabove and the low pressure range disposed therebelow. In this way, in addition to values within the optimum range, values are also included from the ranges that no longer assure optimum driving safety and that improve driving comfort.

BRIEF DESCRIPTION OF THE DRAWING

The aforementioned object, and other objects and advantages of the present invention, will appear more clearly from the following specification in conjunction with the accompanying drawing, which illustrates two graphs that are used for explaining an exemplary embodiment of the inventive method.

The views of the drawings are as follows:

FIG. 6 is a view that schematically illustrates the pressure control arrangement of the present invention.

SUMMARY OF THE INVENTION

Figure 1:
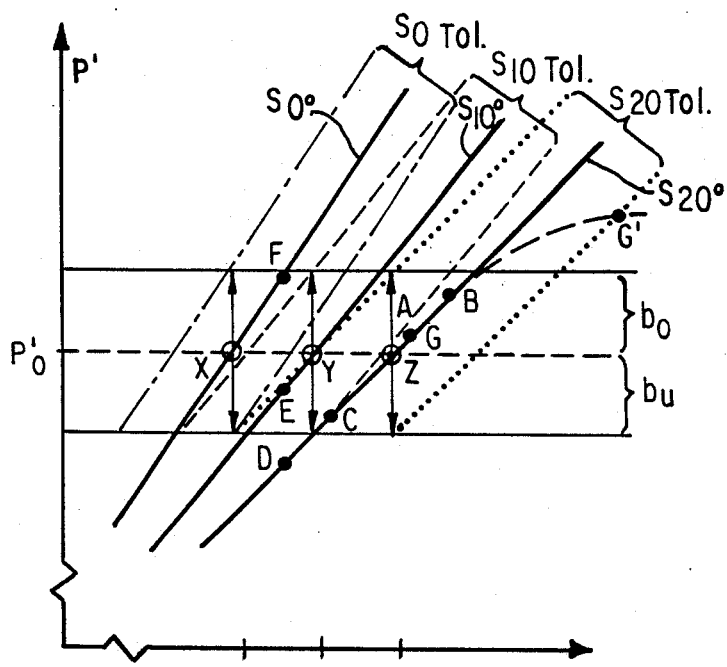
FIG. 1 is a view that shows in a graph the relationship of reference temperatures with respect to fixed reference values concerning upper tolerance range and lower tolerance range for tire (gauge) pressure.

The method of the present invention is characterized primarily by the following steps: comparing the information signal with several specific yet selectable desired value curves, each of which has a tolerance range associated therewith and is a function of an average atmospheric temperature that exists at any given time interval; in conformity with this comparison, at a given point and time, determining at least one deviation of the tire air pressure; assign this deviation to a specific tire air pressure state as a function of the desired values of the desired value curve tolerance ranges, the so-called critical ranges; and indicating one or the actual air pressure state of the pneumatic vehicle tire.

The inventive method is based upon the fact that reference temperatures form the basis of several desired value curves, with these reference temperatures, for the evaluation, covering a wide range, for example from below the 0° C. to above the 20° C. or 30° C. The information signal is evaluated along with the inner temperature of the tire pressure medium, with the information signal in each case being compared with the actual tolerance values of the desired value curves at any given time. In so doing, the tolerance values are altered in conformity to the atmospheric temperature.

Regional and seasonal pressure and temperature influences are taken into account, with reliable actual pressure states being indicated.

Pursuant to a further feature of the inventive method, the desired air pressure values can be determined in conformity with the equation $$p'_s = p'_o + \frac{(\partial p')}{(\partial T_i)} (T_i - T_{io}), \text{ where}$$

$p'$ is the gauge pressure of the tire pressure medium
$p'_s$ is the desired tire pressure
$p'_o$ is a singular, fixed tire pressure $p'$ (tire pressure)=$p_i$ (inner pressure)-$p_1$ (atmospheric pressure)
$T_i$ is the inner temperature of the tire ($T_{io}$ is a singular, fixed inner temperature of the tire.

The tire pressure indicated in conventional tables is a base air pressure related to the load-carrying capacity of the tire. In general, this is a minimum air pressure. However, the air pressures should take into account not only the load of the tire, but also the driving characteristics, maximum speed, the position of the tire on the vehicle, the operating conditions, and the structural properties of the vehicle.

Especially with increased driving characteristics, in particular at higher speeds, the air pressures should be increased for safety reasons. The air pressures are generally increased by 0.1 bar for each increase of 10 km/h above 160 km/h to 210 km/h.

For the sake of improving the driving comfort, and to protect the driving operation from lost pressure, an air pressure state can be detected and evaluated. On the basis thereof, a specific maximum speed can be indicated, or driving can be limited to such a speed.

Pursuant to a further feature of the inventive method, for. this purpose the information signal is additionally compared with a desired value of the tire air pressure, which desired value is assigned to a maximum speed and is recommended pursuant to guidelines or as prescribed pursuant to standards; a maximum speed resulting therefrom is indicated. This indication permits the driver to select and maintain a specific maximum speed without high air pressure.

Pursuant to a variation of the inventive method, to evaluate the information signal, it is also possible to provide only a single, specific selectable desired value curve in place of a plurality of such curves.

In order to apprise the driver of a further operating state that is now in the range of the minimum air pressure, it is possible, pursuant to a further feature of the inventive method, to additionally compare the information signal with a specific, selectable desired value of the tire air pressure that is assigned to an emergency driving speed; this information signal is evaluated and the resulting maximum speed for emergency operation state is indicated. It is useful to indicate such an air pressure value for vehicle wheel and tire assemblies that, despite a loss of pressure, can be further utilized without danger for a certain period of time over longer distances under certain operating conditions. In this case, it is important to know what speed should be selected or maintained in order not to endanger the emergency operation. It is also possible, during emergency operation, to indicate a pressure and/or temperature value, or some other information generated therefrom.

Pursuant to yet another feature of the inventive method, the desired pressure value $p'_o$ can, after the evaluation, and as a function of the deflection movement of the vehicle, be altered on the basis of an appropriate information signal, or a new information signal can be formed from deflection-information signals and air pressure value information signals and can be evaluated at the same time for determining the pressure deviation.

The transmission of the information signals, the evaluation, and the indication can be effected with conventional known means and methods for non-contact transmission of measured values and/or can be effected in an electronic manner.

Further specific features of the present invention will be described in detail subsequently.

DESCRIPTION OF PREFERRED EMBODIMENTS

Referring now to the drawing in detail, in the graph of FIG. 1, the tire (gauge) pressure $p'$ is plotted along the ordinate, and the inner temperature $T_i$ of the tire is plotted along the abscissa. The fixed reference value $p'_o$ for the pressure is indicated as a dashed line. Associated with this fixed reference pressure value are an upper tolerance range, the so-called threshold or critical range, designated $b_o$, and a lower tolerance range, the critical range, designated $b_u$, with these tolerance ranges each being, for example, 0.1 bar.

The desired value curves S are plotted in conformity to the reference points X, Y, Z for specific reference temperatures $T_{io1}$, $T_{io2}$, $T_{io3}$, with $T_{io\ Index}$ in each case being a reference temperature. A greater number or fewer can be provided. This curves S take in to account regional and seasonal influences.

In the illustrated embodiment, for example, the reference points X, Y, Z correspond to outer temperatures of 0° C., 10° C., and 20° C.

Figure 2:
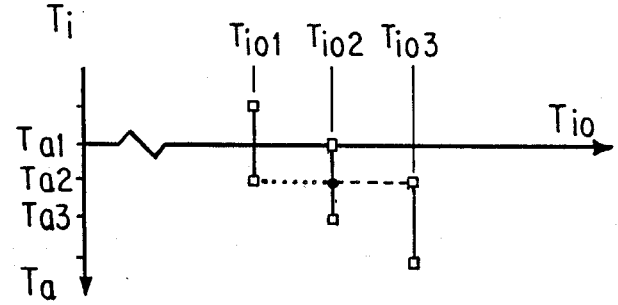
FIG. 2 is a view that shows a graph to illustrate atmospheric temperatures with respect to reference temperatures of inner temperature of a tire pertaining to reference temperature curves.

The temperature reference points are given in FIG. 2, according to which the atmospheric temperature $T_a$, for example $T_{a1}$, $T_{a2}$, $T_{a3}$ . . . , is plotted against the reference temperature $T_{io}$, here the fixed inner temperature of the tire.

In FIG. 1, the desired curves S are indicated, in conformity to the temperature, with $S_{0°}$, $S_{10°}$, $S_{20°}$. These curves extend linearly. A tolerance range is associated with each desired curve. The widths of these tolerance bands, known as critical ranges, are designated $S_{0\ tol}$, $S_{10\ tol}$, and $S_{20\ tol}$.

The operation is as follows.

If, for example, the tire pressure is set to the desired value for 20° C. (see point A, which coincides with the reference value Z), and the atmospheric and inner temperatures are 28° C., then the tire pressure corresponds to the higher value (see point B). This point is within the permissible critical range, so that after evaluation of the information signal, no indication of incorrect pressure (excess pressure) is given.

If, on the other hand, at a different point and time, with the tire pressure set to the desired value for 20° C., the atmospheric and inner temperatures are 8° C., the tire p then actually corresponds to the low pressure indicated by the point D.

At the same time, when the temperature drops below a given temperature, here $T_{a2}$ (see also the graph of FIG. 2), an adjacent desired value curve $S_{10°}$ becomes relevant. The reference point Y of this desired value curve is disposed at the location $T_{io2}$. Also disposed at this location is the associated curve $Z_2$ that pertains for the actual atmospheric temperature $T_{a2}$. Systematically, the curve $Z_3$ would be abandoned, with a transition being made to the always adjacent curve $Z_2$, because the curve $Z_3$ does not include the temperature $T_{a2}$.

The curves $Z_1$, $Z_2$, $Z_3$ . . . are associated with the corresponding reference temperatures $T_{i0}$, $T_{i10}$, and $T_{i20}$. . . In the illustrated example, the application of the transition to the adjacent desired value curve is explained.

Since the actual pressure is below the critical range, an incorrect pressure is indicated after the information signal has been evaluated. The tire pressure is thereupon corrected. The actual pressure value now corresponds to the value for point E of the desired curve for a temperature of 10°. This state is indicated.

If a transition had been made to $Z_1$ (see FIG. 2), the previously mentioned incorrect pressure would have been corrected to a pressure corresponding to the point F. This pressure would then have been indicated. This pressure is also still within the tolerance range.

Assuming the presence of a tire pressure and temperature corresponding to the point G in FIG. 1, the pressure and temperature during driving operation would have been set in conformity with the curve $S_{20°}$.

If the tire leaks, the pressure and temperature are changed, and a point G' is reached on the curve that is indicated by dashed lines. This point G' lies beyond the tolerance range $S_{20\ tol}$. After evaluation of the information signal, an incorrect pressure (low pressure) is indicated. The tire pressure is thereupon corrected in conformity to the curve $S_{20°}$. By virtue of the desired curves that are provided, it is possible, after evaluation, to indicate an actual pressure state in a precise and reliable manner taking into account seasonal and regional influences.

The present invention concerns a method for determination, evaluation and indication of tire air pressure values on vehicle pneumatic tires 10. With this method, information signals are employed that are based upon at least these air pressure values measured by means of pressure sensors 12 and transferred via lines or conduits 14 and respectively each involving a non-contact signal transfer consisting of an emitter or sender unit 16 rotating with the tire 10 and a corresponding receiver unit 18 installed non-rotating or fixed within range of the emitter or sending unit 16; the information signals are transmitted and fed hereby into a processor 20 via further lines or conduits 19; then the information signals are compared and evaluated in the processor 20 compared as to several rated or desired value curves with a tolerance range and median value for the tire outer temperature. The pressure deviation is subsequently coordinated or correlated as to a predetermined pressure condition in the aforementioned processor 20 dependent upon the rated or desired value tolerance ranges and from that there is indicated an actual air pressure condition taking into consideration the regional and seasonally conditioned pressure- and temperature influences for the particular time of year. This is possible, since in the processor 20, so far as is necessary, an outer air pressure signal and an outer temperature signal are fed or supplied. The outer air pressure signal is produced by means of an outer air pressure sensor 22 and fed into the processor 20 via a line or conduit 24, while the outer temperature signal is produced by a temperature sensor 26 and fed or supplied into the processor 20 via a further line or conduit 28.

Additionally there is noted that a maximum speed and a permissible speed during emergency operation or an emergency operating condition can be determined by the processor 20. For this purpose the processor 20 must have at its disposal a storage register or memory 30, in which all firm prescribed (rated- or desired-) information has been deposited or provided.

The views of FIGS. 2A, 3, 4, 5 and 6 provide schematic illustration as to features of a processor in part in conjunction with the following additional explanatory paragraphs which relate to the processor.

For evaluation, analysis or interpretation of the tire air pressures, these tire air pressures must be detected or determined first by the pressure sensors 12. The signals are then transmitted contactless onto a receiver 18 via the lines or conduits 14 and the sender 16 of each tire 10 individually and the signals are then introduced into the processor 20 via further lines or conduits 19. Internal pressure signals ($P_i$-signals) are extracted there in the processor 20 from the received signals in the signal converters 40 and a corresponding expression signal ($p_a$-signal) is withdrawn or taken from these internal pressure signals ($P_i$-signals) in the differentiating members or elements 42. The $p_a$ signal with that is produced by the signal converter 44 out of the signal of the external air pressure sensor 22, which is fed or supplied to the processor via the line or conduit 24. The signals emerging behind or after the differentiating members or elements 42 correspond to the over pressure p'. These over pressure signals can be visualized per over pressure indication 80.

A maximum vehicle speed $v_{max.total}$ likewise can be brought to indication 82 from the over pressure signals, when additionally tire-load dependent signals/information are available. This, for example, is realizable thereby that proportional signals "e" as to respective tire sensors are allotted rated-tire over-pressure differences $\Delta p'_{s,e}$ via memory or storage means 32; and then these $\Delta p'_{s,e}$-signals besides the p'-signals via the memory or storage means 33 order, call off or recall permissible maximum-speed signals ($v_{max}$-signals), of which the minimum is determined in the subsequent minimizing member or element 4 and is represented via the aforementioned indication 82. Moreover additionally it is possible to utilize the actual travelling speed v in the processor 20. This is necessary when for comfort reasons there is to be travelled with more nominal air pressure p' then is necessary with vehicle maximum speed. If here there is still to be indicated the optimum, there must be provided a corresponding rated or desired-tire-over-pressure value-compensation, realizable for example via employment of a memory or storage means 34 by way of which the corresponding rated or desired tire-over-pressure difference $\Delta p'_{s,v}$ can be ordered or called forth as signals along with the signal v dependent upon vehicle speed.

The taking into consideration of the outer temperature $T_a$ occurs via a measurement by means of sensor 26, of which the output signal reaches the processor via the line or conduit 28. An external temperature signal ($T_a$-signal) is produced from an ingoing signal in the signal converter 48 and this outside temperature signal subsequently is supplied to a timing generator or impulser 50. The aforementioned timing generator or impulser 50 has the following two functions;

(1) the timing generator or impulser 50 conveys the $T_a$-signals on to a temperature-median-value forming means (temp-median) 52 when the vehicle is operating and the corresponding operating switch 54 is closed; and (2) the timing generator or impulser 50 transmits the continuing or running operation time $T_{operation}$ to the temperature median or averaging means 52.

The operating time is required in the temperature median or averaging means 52 in order to allot or supply the temperature median or averaging to a set or adjusted operating time interval.

The tire-outer-temperature median or average value signal $T_a$ is then applied at the output of the temperature median or averaging means 52 and this median or averaging value signal is then fed or advanced into a temperature digitizer 56. The temperature digitizer 56 tests whether the $T_a$-signal still corresponds to the actual allotment $Z_j$ (see FIG. 2 of the patent application) and to this situation the reference inner temperature $T_{io}$ remains unchanged, or the allotment to $Z_{j-1}$ or $Z_{j+1}$ must be changed or varied to this extent so that again a permissible definite allotment exists with the applied $T_a$-signal (in this situation the reference temperature $T_{io}$ changes or varies). The digitizer 56 delivers the corresponding $T_{io}$-signal at its output.

With this $T_{io}$ and the tire interior temperature signals ($T_i$-signals), which can be transmitted and introduced to the processor 20 analogous to the $P_i$-signals with temperature sensors 13, lines or conduits 15, emitters or senders 17, receivers 21 and supply lines 23 to the processor 20, there is noted that the actual desired tire over pressure signals ($p_a$-signals) can be ordered or taken from the memory or storage means 36, which actual rated or desired tire over pressure signals are deposited in the memory or storage means 36 dependent upon the $P_{io}$- and the $T_{io}$-signals, or at least a kind or type of these signals.

The p'-signals, $\Delta p'_{s,e}$-signals and $\Delta p'_{s,v}$ and $\Delta p'_s$-signals are brought together in respective inverter/addition members 58 and via the respective addition of p'-signals and the inverted $\Delta p'_s$-signals, $\Delta p'_{s,v}$-signals and p'$_s$-signals there are generated or produced pressure-deviation signals ($\Delta p'$-signals) at the outputs of the inverter/addition members 58.

These $\Delta p'$-signals enter or go into the tolerance addition members 60 in which with tolerance values for the upper and lower as well as for the emergency-running threshold regions limits ($b_o$-limits, $b_u$-limits and $b^*_u$-limits); these signals are deposited in the tolerance memory or storage means (38) connected to the tolerance addition means 60; this arrangement produces and delivers relative deviation signals $\Delta p'$-$b_o$-value, $\Delta p'$+$b_u$-value and $\Delta p'$+$b^*$-value. These relative deviation signals now finally reach and come into the evaluation units 62 in order to be tested for the fulfilling of several inquiries. Each positive inquiry leads to the switching of a corresponding indication in the indication members 84. The possibilities for indication members 80, 82, 84 are set forth and represented in the views of the drawings and the labels are worded as follows:

84 like 80, but in place of digital indication:

Symbol for: the pressure can be reduced; possible color identification: blue.

Symbol for: the pressure lies in the rated or desired threshold range; possible color designation: green.

Symbol for: the pressure is to be increased as soon as possible; possible color representation: yellow.

Symbol for: the pressure lies clearly under the operating range. By all means there must be attention directed the vehicle highest or maximum speed indication 82—if present or at hand—otherwise stop immediately and inspect tires and if necessary interchange or replace; possible color representation: red.

In the uppermost box there is a label "tire over pressures" as well as to the right of the upper box 80 a word digital indication; along a top portion inside the box in the middle of the page and identified by reference 82 there is a label "maximum permissible travel speed". In the lowermost box the bottom word "notlauf" means in English—emergency running—. This bottom box or block 84 appears also in a lower right hand corner of a schematic diagram which at the left has a vertical arrangement of six boxes of which the top two represent signal converters 40 and 44; the middle two boxes represent a memory or storage means 32, 34; and the next to the last box from the bottom represents a signal converter 48 and the bottom box represents an operating switch 54. To the right of these six boxes located one above the other there can be found a timing generator or impulser 50 showing by a line or conduit to transmit $T_a$-signals impulsed $t_{operation}$ to a temperature median or averaging means and then on via a conduit to a temperature digitizer and then on via another line or conduit to a memory storage means 36. At the top near the center there is an over pressure indicator 80 and to the right thereof there is a $V_{max}$-indicator 82 for the velocity indication; the dash-line or box surrounding the components can be found identified as a processor boundary or limit for the processor 20 as marked centrally inside this dash-line box. In the lower right portion of the processor limits there can be identified an evaluation unit 62 with appropriate values being set forth to the right and therebelow with a tolerance addition member 60 as well as a tolerance memory or storage 38 for predetermined values mentioned in the foregoing paragraphs being identified therewith. In the lower right hand corner there can be found the indication of the air pressure condition identified by the box 84 corresponding to the previously mentioned box 84 having a bottom quarter thereof labelled "emergency running".

The following paragraphs also will clarify that which is believed to be decisively different from the known prior art.

1. Transmitting an information signal and
2. Measured value emitter

Figure 2A:
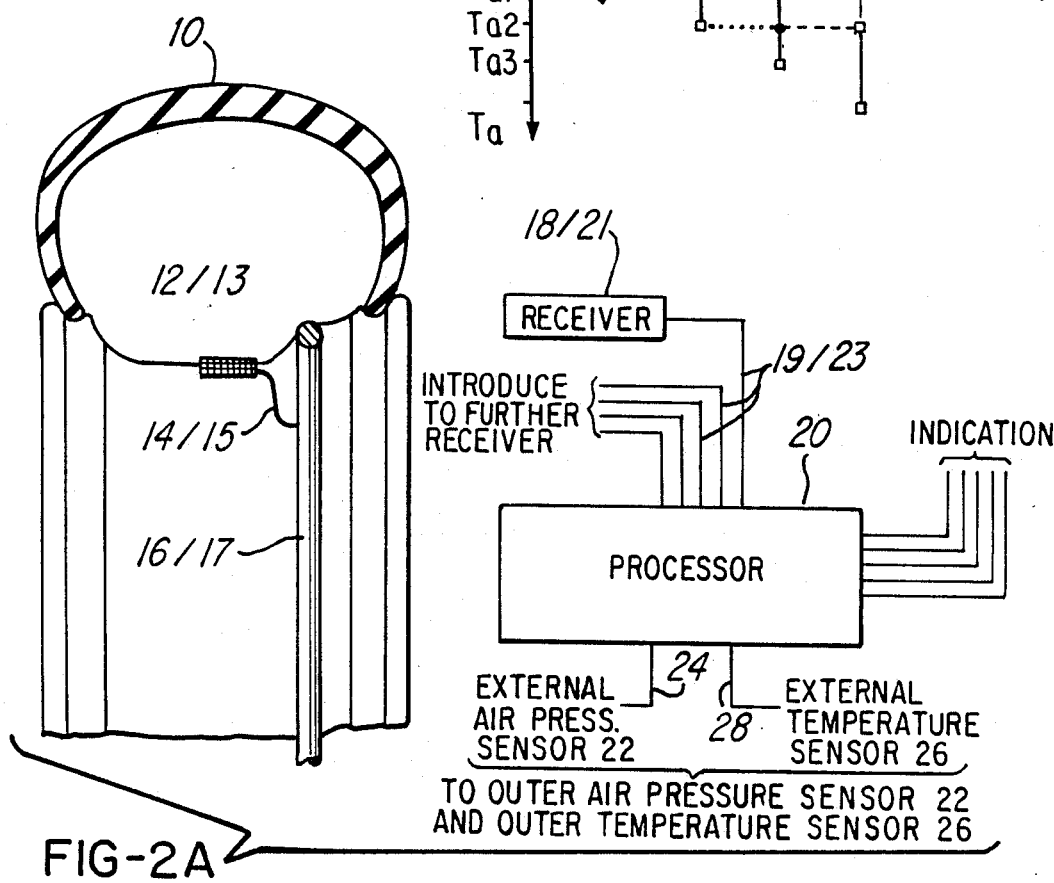
FIG. 2A is a fragmentary view of a cross section of a wheel and tire equipped with components to provide an indication to an outer air pressure sensor and an outer temperature sensor with respect to tire pressure control in accordance with the present invention.

There is to be noted the following with respect to transmitting an information signal 2 as to a measured value emitter on the basis of which pressure and/or temperature produce a pressure value respectively a temperature value in a sensor or in a separate sensor means; reference can be made to FIG. 2A showing a tire 10 and the sensor 12 with a line 14. The sensor is a component of a resonant or oscillatory circuit, of which two are provided, a so-called primary circuit on the vehicle and a so-called secondary circuit on the tire. Each circuit has a natural-period behavior or attitude, which changes or varies with received values. The resistance changes or variations with an enclosed electrical circuit cause a changed or varied oscillation behavior or attitude.

The resonant or oscillatory circuit is excited or energized by a signal from the vehicle side, for example by a sender or emitter (active circuit). The same is brought into oscillation and excites or energizes the secondary circuit. An oscillation is induced and is obtained or read-off upon a receiver. That, which is obtained or read-off as to oscillations, in a signal value, involving a component of the known contactless transfer of signal values. A comparison can be made with the illustration as mentioned previously including a pressure sensor 12 and a sender or emitter 16 installed on the tire (left half of FIG. 2A). The signal transfer here occurs in a contactless manner upon a receiver 18 shown in the right half of FIG. 2A; this receiver 18 is the receiver 18 and forwarding via the line 19 must be converted into a modulated frequency, for example an electrical voltage. There is to exist a potentially-adequate digital information. For this purpose, all signal values from line 19 are converted in a signal converter 40 into interior pressure signals "$P_i$ signals" into electrical voltage or potential values and with that these signals are prepared potentially-adequate and usable digitally.

These $P_i$-signals are supplied to an addition member or element 42, which likewise receives prepared (external pressure) $P_1$-signals (via line 24 and signal converter 44). Here for example the interior pressure $P_i$ is reduced in order to obtain the external pressure $P_a$ as an over pressure $P'$ and supplied or introduced as a digital value into the addition member or element 58. This addition member or element 58 receives the further signal of the rated-tire over pressure value $P'_s$. The transmittal and preparation of this value is described elsewhere herein. The consideration of the external temperature $T_a$ occurs via a measurement by means of a sensor 26, of which the output signal reaches the processor via the line 28. In the signal converter 48 from the introduced signal there is produced an external temperature signal $T_a$-signal, which subsequently is fed or supplied to the impulse generator or impulsing means 50. This impulsing means 50 has two functions: (1) the impulsing means conveys the $T_a$-signals to a temperature-median value forming means (temperature median means) 52 when the vehicle is operated and the corresponding operating switch 54 is closed; (2) the impulsing means 50 transmits the continuous operating time $t_{Betrieb}$-operation to the temperature median means 52. The operating time is required in the temperature median means 52 in order to allot the temperature median or average to an adjusted or set operating time interval.

Additional further signals can be supplied to the addition member or element 58 and moreover for predetermined air pressures for comfort reasons, for high speed operation and for a predetermined permissible speed during emergency running or during an emergency running condition.

Figure 3:
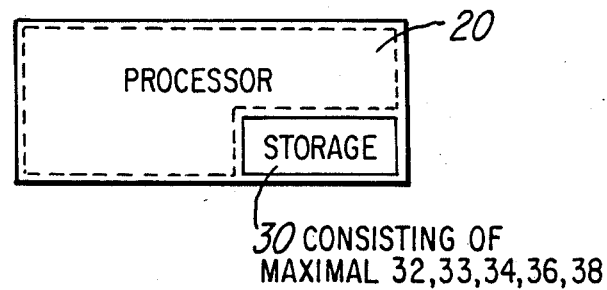
FIG. 3 is a view that illustrates a component of FIG. 2A in greater detail.
Figure 4:
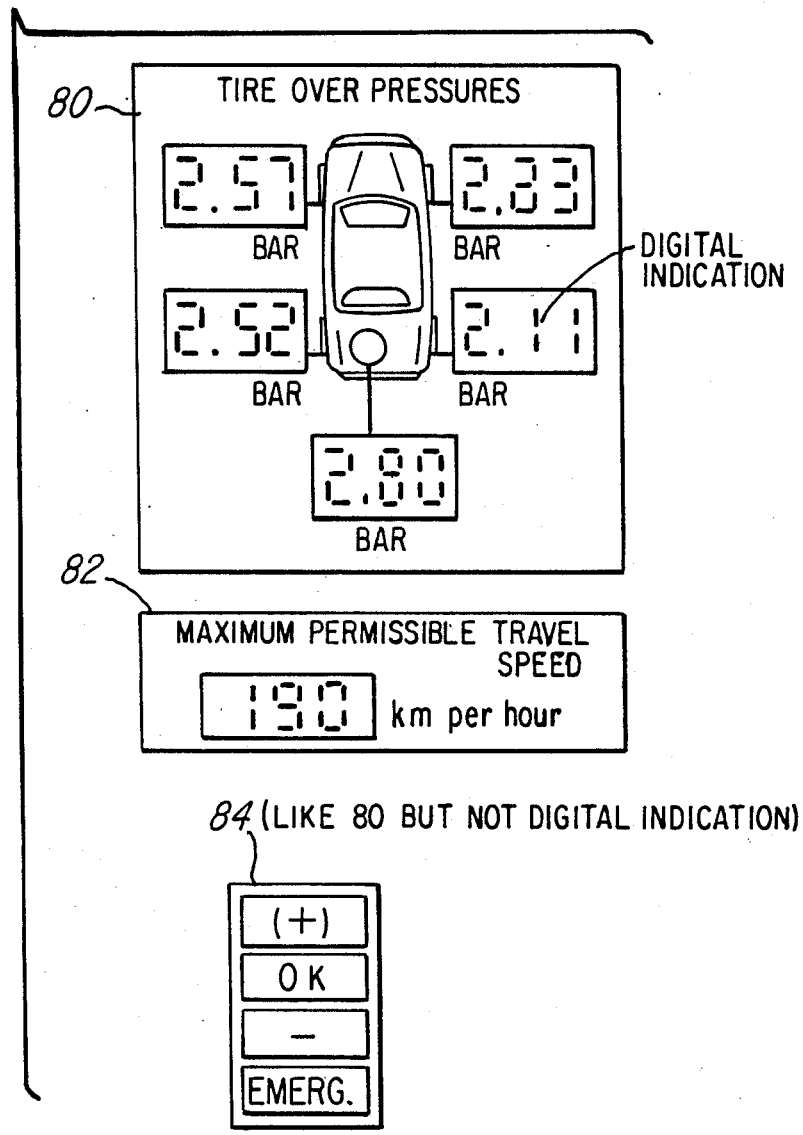
FIG. 4 is a view that diagrammatically illustrates means for digital indication of tire pressure control arrangement have features in accordance with the present invention.
Figure 5:
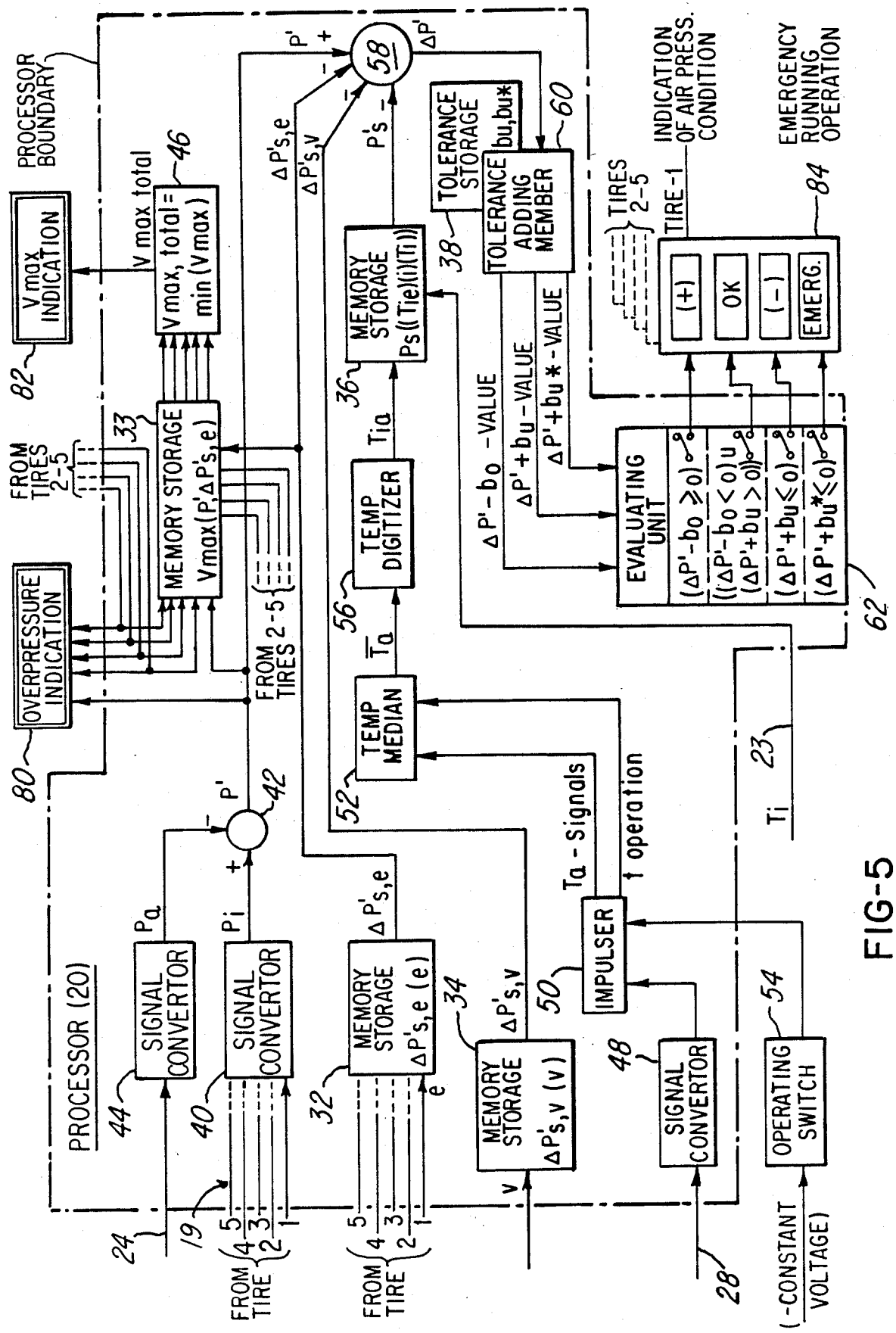
FIG. 5 is a view that shows schematically and diagrammatically the components of an arrangement in accordance with the present invention for tire pressure control.

For this a storage means is necessary which is identified with reference numeral 30 in FIG. 3 and consisting of several individual storage means 32 etc. for predetermined information, the rated information and the like.

The individual values are processed in the addition member or element 58 and deliver the tire over pressure difference $\Delta p'$ as $\Delta p'$-signals (pressure deviation signal) and a result is the deviation value that is usable digitally.

3. Signal and value curves

The storage means 36 consists of a matrix, which as a memory has at its disposal a plurality of values. Programmable storage building blocks or modules contain many locations for different pressures. The curves according to FIG. 1 of the patent drawing in the present case exist digitalized in this storage means and correspond to lining-up or combining as to each other in rows of digital locations which correspond to pressures in predetermined, nominal steps or stages. By comparison of an introduced signal value with the storage-space locations there is transmitted or obtained a predetermined rated over pressure $P'_s$. This rated over pressure is supplied to the addition member or element 58.

The situation is in accordance with the description of drawing illustrations, such that the storage inquiry or interrogation 36 is complex, since there are obtained and compared pressures $P'_s$ dependent upon tire-external temperature $T_a$—compare line 28, signal converter 48, impulsing emitter 50 and temperature median or averaging means 52 as well as digitizer 56—being processed with arriving signal values $T_i$ and $T_{io}$, from fixed tire interior temperature $T_{io}$ and the actual tire inner temperature $T_i$, comparing the input line 23 arriving for processing in the storage means. This is a portion of the invention.

4. Deviation assigned. This is the further part of the invention.

The pressure deviations $\Delta p'$ are now additionally evaluated in a very complex manner. This means, rated value tolerance ranges stored in memory 38 are at hand or available, whereby a threshold range b upper value ($b_o$) and a threshold b lower value ($b_u$) are stored. It is possible also to store a threshold range $b_u^*$, which pertains to the emergency running operation.

These rated value tolerance ranges are allotted as to predetermined pressure conditions, and actual, regional and time-of-year required or conditioned pressure influences and temperature influences taking into consideration air pressure conditions are obtained accordingly. This means that the signal values of the pressure deviation $\Delta p'$ are evaluated at the output of the addition rotating with the tire 10 and a corresponding receiving unit 18, which is installed nonrotating in the range of the sender unit 16, being transmitted and stored in a processor 20 via further lines 19 and there being compared and evaluated with several rated value curves with tolerance range and median or average value for the tire external temperature. The pressure deviation is subsequently allotted a predetermined pressure condition in the aforementioned processor 20 dependent upon the rated value tolerance ranges and from that an actual, air pressure condition is indicated taking into consideration the regional and time-of-year condition pressure influences and temperature influences. This is possible, since in the processor 20, so far as necessary, an external air pressure signal and an external temperature signal are stored. The external air pressure signal is generated or produced by means of an external air pressure sensor 22 and is fed or supplied via a line 24 into the processor 20, while the external temperature signal is produced or generated by a temperature sensor 26 and is conveyed into the processor 20 via a further line 28.

Additionally, a high speed and a permissible speed during emergency running or an emergency running condition can be transmitted by the processor 20. For this the processor 20 must have at its disposal a storage means 30, in which all rigidly prescribed (rated-) information has been deposited.

For evaluation of the tire air pressures there is noted that these must first be detected by pressure sensors 12. The signals are transferred contactless onto the receiver 18 via lines 14 and the sender 16 of each tire 10 respectively and these signals are introduced into the processor 20. There, inner pressure signals ($P_i$-signals) are extracted from the received signals in the signal converter means 40 and from these signals in differentiating members 42 there is withdrawn a corresponding external pressure signal ($P_a$-signal). The external pressure signal ($P_a$-signal) with that is produced or generated from the signal converter 44 out of the signal of the external air pressure sensor 22, which is supplied to the processor via the line 24. The signals discharging after or following the differentiating members or elements 42 correspond to the over pressures p'. These over pressure signals can be visualized per over pressure indication means 80.

Likewise there is noted that from the over pressure signals there can be brought to an indication 82 a maximum vehicle speed $v_{max.total}$, when additionally tire load dependent signals/ information are available. This can be realized for example thereby that the respective tire feelers have proportional signals e allotted or associated therewith via a storage means 32 rated-tire over pressure differences $\Delta p'_{s,e}$—signals besides the p'-signals being taken via the storage means 33 as to permissible maximum speed signals ($v_{max}$-signals), the minimum of which is transmitted or made available in the following minimizing member or element 46 and being represented via the aforementioned indicator 82.

Additionally it is possible, to employ or utilize the actual vehicle speed v in process 20. This is made necessary, when for comfort reasons with small or nominal air pressure p' there is to occur travel with such air pressures which are smaller or less than necessary at vehicle highest speed. If here the optimum is still to be indicated, then a corresponding rated tire over pressure value compensation must be provided correspondingly, —realizable for example by employment of a storage means 34, via which with a signal v dependent upon the vehicle speed there can be taken the corresponding rated tire over pressure difference $\Delta p'_{s,v}$ as a signal taken therefrom.

The consideration of the external temperature $T_a$ occurs via a measurement by means of a sensor 26, of which the output signal reaches the processor via the line 28. In the signal converter 48 there is produced or generated an external temperature signal ($T_a$-signal) on the basis of the entering signal, which external temperature signal ($T_a$-signal) subsequently is supplied to an impulse emitter 50. The aforementioned impulse emitter 50 has two functions as follows:

1. The impulse emitter forwards the $T_a$-signals to a temperature median or average value forming means (temp median or averaging) 52, when the vehicle is operated and the corresponding operational switch is closed;

2. The impulse emitter 50 transmits the continuous operating time $t_{Betrieb}$-operation as to the temperature averaging or median means 52. The operating time is required in the temperature median or averaging means 52 in order to allot a set or adjusted operating time interval as to the temperature median or averaging means.

At the output of the temperature median or averaging means 52 there is then located the tire external temperature median value signal $T_a$ applicable thereto which is forwarded into a temperature digitizer 56. The digitizer 56 tests whether the $T_a$-signal still corresponds to the actual allotment $Z_j$ (see FIG. 2 of the patent application) and (in this situation the reference inner temperature $T_{io}$ remains unchanged), or the allotment as to $Z_{j-1}$ or $Z_{j+1}$ must be changed or varied so that again a permissible definite allotment exists with applied with $T_a$-signal (in this case the reference temperature $T_{io}$ changes itself). The digitizer 56 outputs the corresponding $T_{io}$-signal at its output.

With these $T_{io}$ and the tire inner temperature signals ($T_i$-signals) the same are transmitted and introduced analogue to the $P_i$-signals with temperature sensors 13, lines 15, sender 17, receivers 21 and supply lines 21 to the processor 20 are obtained and then there can be taken the actual rated tire over pressure signals ($p_s$-signals) from the storage means 36, which $p_s$-signals in the storage means 36 are dependent upon the $T_{io}$—and the $T_i$-signals or at least a sort of these signals being deposited.

The p'-signals, $\Delta p'_{s,e}$ signals and $\Delta p'_{s,v}$ and $p'_s$-signals are brought together in the respective invertor-addition members or elements 58 and via the respective addition of the p'- and the inverted $\Delta p'_{s,e}$-, $\Delta p'_{s,v}$ and $p'_s$-signals produced pressure deviation signals ($\Delta p'$-signals) at the outputs of the invertor/addition members or elements 58.

These $\Delta p'$-signals go into the tolerance addition members or elements 60 in which with tolerance values for the upper and lower as well as for the emergency running-threshold range limits ($b_o$-, $b_u$- and $b^*_u$-limits), which are deposited in the tolerance storage means 38 that is connected to the tolerance addition member or element 60 to produce the relative deviation signals $\Delta p'$-$b_0$-value, $\Delta p'+b_u$-value and $\Delta p'+b^*_u$-value and being given out or discharged. These relative deviation signals now finally come into the evaluation unit 62, in order to be tested or examined as to the fulfilling of several inquiries. Each positive inquiry leads to the switching of the corresponding indication in the indicator members 84. Possible indicator members 80, 82, 84 are also set forth in the drawing illustrations.

The present invention is, of course, in no way restricted to the specific disclosure of the specification and drawing, but also encompasses any modifications within the scope of the appended claims.

What is claimed is:

1. In a method of giving a vehicle driver the best possible information concerning vehicle tire pressure including factors of atmospheric pressure, inner temperature of the tire, and specific volume by determining a variable air pressure value of a pneumatic vehicle tire, based on transmitting of an information signal of high frequency modulated by a sensor and taken from a measured value emitter and conveyed to a measured value receiver for comparison between high frequency modulated by the sensor and a known high frequency at tire rated pressure stored in a storage means; evaluating this information signal, via evaluation means, including control circuit logic during the comparison at tire rated pressure with desired values at least for the air pressure of the pneumatic vehicle tire; determining a deviation value obtained by said evaluating during the comparison at tire rated pressure; and indicating an air pressure for the pneumatic vehicle tire based on the measured value; the improvement therewith further comprising in combination the steps of:

comparing said information signal with several specific selectable desired value curves representing pressure ranges for specific values of atmospheric temperature and inner tire temperatures, each of which has a tolerable critical range extending along the curve indicative of acceptable pressure values for given temperatures and each of which is a mathematical function of an average atmospheric temperature that exists at any given time interval;

after said comparing, determining at least one deviation value of said tire air pressure;

assigning this deviation value to a specific tire air pressure as a mathematical function based on said desired value curve tolerance ranges; and then indicating at least the actual air pressure of said pneumatic vehicle tire and an indication of incorrect pressure being given when not within the tolerable critical range.

2. A method in combination according to claim 1, including the steps of: additionally comparing said information with at least one desired tire air pressure value that is associated with a predetermined maximum speed evaluating this comparison to produce a maximum safe speed value, and indicating this value.

3. A method in combination according to claim 2, which, for said evaluating step, includes the step of utilizing a single predetermined value curve.

4. A method in combination according to claim 1, including the steps of: additionally comparing said information signal with a specific, selectable desired tire air pressure value that is associated with an emergency operation driving sped' evaluating resulting information therefrom to form a maximum safe speed and indicating the maximum safe speed resulting.

5. A method in combination according to claim 1, wherein desired tire pressure values are determined according to the equation $$p'_s = p'_o + \frac{(\partial p')}{(\partial T_i)} (T_i - T_{io})$$

where p' is the gauge pressure of the tire pressure medium, $p'_s$ is the desired tire pressure value, $p'_o$ is a singular, fixed tire pressure value, $T_i$ is the inner temperature of the tire, and $T_{io}$ is a singular, fixed inner tire temperature.

* * * * *